United States Patent [19]

Reed

[11] 3,858,185

[45] Dec. 31, 1974

[54] MOS DYNAMIC MEMORY ARRAY & REFRESHING SYSTEM

[75] Inventor: John A. Reed, Los Altos, Calif.

[73] Assignee: Intel Corporation, Santa Clara, Calif.

[22] Filed: July 18, 1973

[21] Appl. No.: 380,347

[52] U.S. Cl. .......................... 340/173 DR, 340/172.5

[51] Int. Cl. .......................... G11c 11/40, G11c 11/24

[58] Field of Search .............................. 340/173 DR

[56] References Cited

UNITED STATES PATENTS

| | | | |
|---|---|---|---|
| 3,718,915 | 2/1973 | Lattin | 340/173 DR |
| 3,719,932 | 3/1973 | Cappon | 340/173 DR |
| 3,731,287 | 5/1973 | Seely | 340/173 DR |
| 3,736,572 | 5/1973 | Tu | 340/173 DR |
| 3,737,879 | 6/1973 | Greene | 340/173 DR |
| 3,748,651 | 7/1973 | Mesnik | 340/173 DR |
| 3,760,379 | 9/1973 | Nibby | 340/173 DR |
| 3,765,003 | 10/1973 | Paivinen | 340/173 DR |
| 3,771,148 | 11/1973 | Aneshansley | 340/173 DR |
| 3,786,437 | 1/1974 | Croxon | 340/173 DR |
| 3,790,961 | 1/1974 | Palfi | 340/173 DR |

*Primary Examiner*—Terrell W. Fears
*Attorney, Agent, or Firm*—Spensley, Horn & Lubitz

[57] ABSTRACT

A metal-oxide-semiconductor (MOS) random-access-memory array which utilizes dynamic memory cells is disclosed. All the cells in the array are simultaneously refreshed upon the application of a single external refresh signal. The array does not require synchronization of the refresh signal and memory access signal.

2 Claims, 4 Drawing Figures

MOS DYNAMIC MEMORY ARRAY & REFRESHING SYSTEM

BACKGROUND OF THE INVENTION

1. Field of the Invention

The invention relates to the field of MOS dynamic memories.

2. Prior Art

Capacitors have for many years been utilized to store information, particularly digital information. The storage of information in this form is transient, that is, it is continually decaying and, hence, if the information is to remain stored for any period of time it must be refreshed or otherwise regenerated. One example of such storage is shown in U.S. Pat. No. 3,111,649.

MOS devices have been utilized in memory arrays for the dynamic storage of digital information. Often the information is stored on the gates of MOS field-effect-transistors (FETs) since the gates of these devices exhibit relatively high capacitance. These storage MOS devices are generally included in memory cells which allow information to be selectively placed into and read from each cell. The memory cells are most often arranged in arrays which include a plurality of X- and Y-coordinate lines. The prior art teaches the refreshing of the information stored in these cells and this information is refreshed in some arrays by simultaneously refreshing a row or column in the array. Most often the information is read from the cells and regenerated in a refresh amplifier. One such system for refreshing the information stored in an MOS dynamic memory is shown in U.S. Pat. No. 3,599,180.

During the time that a prior art array is being refreshed, information cannot be read from or read into memory. Thus, these memories generally have restrictions on them concerning when they may be accessed. Also, since less than the entire array is simultaneously refreshed, refreshing time must be set aside for the refresh cycle.

As will be seen, the presently disclosed invention includes an MOS dynamic memory array in which the entire array is simultaneously refreshed. The refreshing signal which may be externally applied need not be synchronized with the signals used to access the array.

SUMMARY OF THE INVENTION

An MOS memory array which utilizes a plurality of dynamic memory cells is described. Each memory cell includes a bistable circuit coupled to a pair of column lines and a row line in the array. By the application of signals to both the column and row lines in the array, all the cells in the array may be simultaneously refreshed. The array includes a refreshing buffer which receives an external refreshing pulse and provides an output internal refreshing pulse having a predetermined width. The width of this refreshing pulse is sufficient to allow the entire array to be simultaneously refreshed without damaging the cells or causing loss of the information stored in the cells.

The array includes circuitry for implementing a refresh abort cycle in the event that a memory enable or memory access signal (CL signal) is received by the array during the time that the array is being refreshed. In such an event the refreshing is aborted and after discharging of the row lines in the array, the memory is accessed. Following the access, and provided the external refresh signal is still present, the array is refreshed.

DETAILED DESCRIPTION OF THE INVENTION

The presently preferred embodiment of the invention is utilized in a random-access-memory having a capacity of 1,024 bits and arranged in a 32 × 32 array. The entire memory, including the cells, decoders and refreshing circuitry of the present invention, are fabricated on a single substrate utilizing known MOS technology. In the presently preferred embodiment all the MOS devices comprise n-channel field effect transistors which employ polycrystalline silicon gates. Other circuits utilized in this random-access-memory are disclosed in copending application Ser. No. 380,350 filed July 18, 1973, Ser. No. 380,349 filed July 18, 1973, and Ser. No. 380,348 filed July 18, 1973, all of which are assigned to the assignee of the present application. As will be appreciated, the invention may be fabricated utilizing p-channel devices or in different size arrays with modified circuitry. For the purposes of discussion in this application, it will be assumed that enhancement mode n-channel devices are utilized and that a positive voltage must be applied to the gates of these devices in order to have conduction between the source and drain terminals of the devices.

Figure 1:
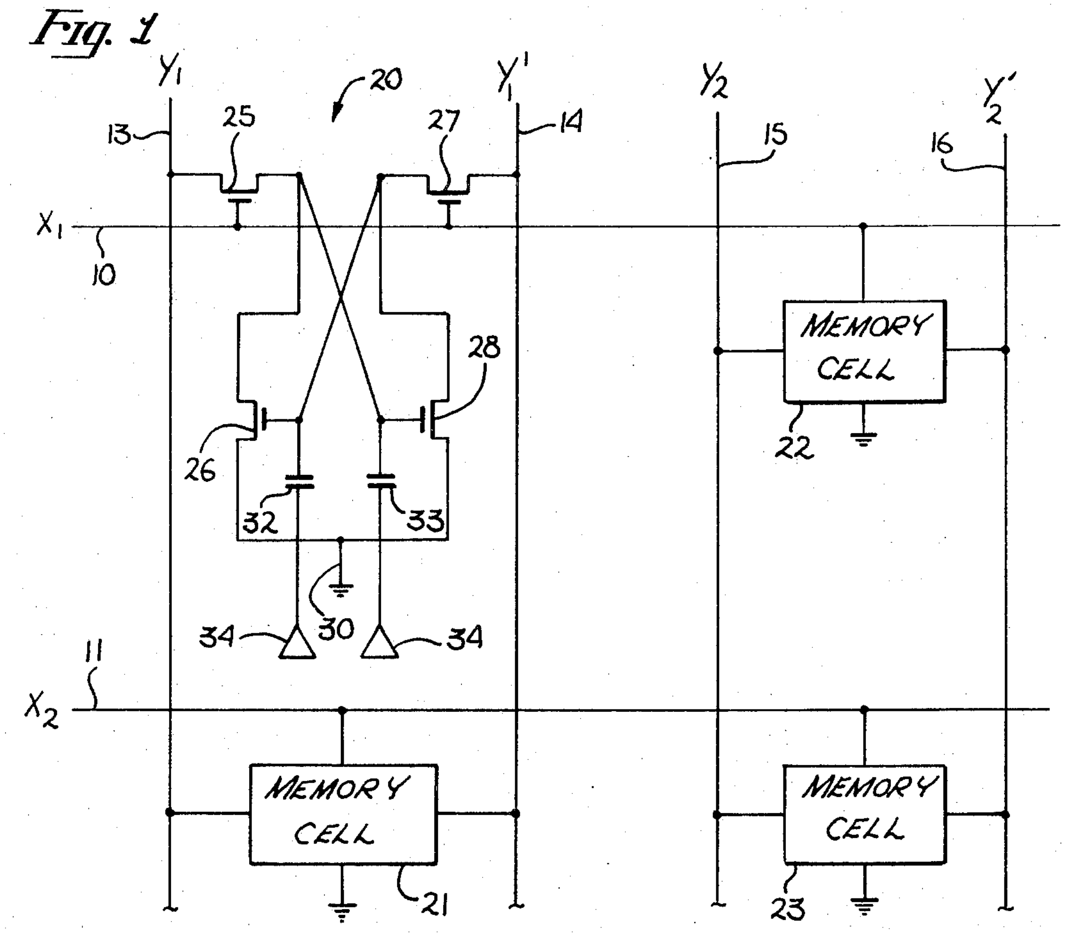
FIG. 1 is an electrical schematic illustrating a portion of the memory array and in particular the memory cell utilized in the presently preferred embodiment.

Referring to FIG. 1, a section of the memory array is disclosed which includes a plurality of X-lines and a plurality of Y-lines with memory cells coupled to the X-lines and Y-lines. Two X-lines, $X_1$ and $X_2$, lines 10 and 11, respectively, are illustrated and two pairs of Y-lines designated $Y_1$ and $Y'_1$, and $Y_2$ and $Y'_2$, lines 13, 14, 15 and 16, respectively, are also illustrated. A memory cell is coupled to each X-line at approximately the intersection of the X-line with each pair of Y-lines. For example, memory cell 20 is coupled to X-line 10 and Y-lines 13 and 14, memory cell 21 is coupled to the $X_2$ line and the $Y_1$ lines, memory cell 22, is coupled to the $X_1$ line and the $Y_2$ lines and memory cell 23 is coupled to the $X_2$ line and the $Y_2$ lines. This cell arrangement is the common arrangement utilized for such random-access-memories and other memories.

One of the memory cells 20 is illustrated in detail and includes a bistable circuit having a first leg which includes MOS devices 25 and 26 and a second leg which includes MOS devices 27 and 28. When current is flowing in the cell it flows through one of the two legs as a function of the contents of the cell (i.e., a 1 or a 0). MOS devices 25 and 26 are coupled between line 13 and ground 30 while MOS devices 27 and 28 are coupled between line 14 and ground 30. The cell 20 stores information in the form of a charge placed on either capacitor 32 or 33. These capacitors in the presently preferred embodiment are the parasitic capacitances primarily formed by the gates of devices 26 and 28 and the substrate shown as substrate 34. As is frequently done with such arrays, the substrate 34 may be biased relative to the ground 30.

The cell 20 is programmed with a 1 or a 0 by either charging the capacitor 32 or the capacitor 33. For the purposes of discussion, assume that the cell is programmed with a 1 when a charge exists on capacitor 32 (and no substantial charge is present on capacitor 33) and a 0 when a charge exists on the capacitor 33. To charge the cell with a 1, first a positive charge is placed on line 14 (no charge is placed on line 13). A positive potential is applied to line 20 causing MOS devices 25 and 27 to conduct. As device 27 conducts, the charge previously placed on line 14 is transferred through device 27 onto capacitor 32. Since no charge was placed on line 13, capacitor 33 is uncharged. In order to determine whether the cell 20 has been programmed with either a 1 or a 0, positive potentials or charges are applied to lines 13 and 14 and also to line 10. If the cell has been previously programmed with a 1, device 26 will conduct and a path will exist from line 14 to ground through the series combination of MOS devices 27 and 26. By detecting the loss of charge on line 14 it can be determined that a 1 had been programmed into memory cell 20. The previously mentioned application Ser. No. 380,349 describes an amplifier which is coupled to the Y-lines in the array and used for sensing the loss of charge on the Y-lines in the array.

Since the charges placed on the capaictors in the memory cells of the array, such as capacitors 32 or 33, are transient they must be refreshed for the information to remain stored. As will be explained in more detail, all the memory cells in the array are simultaneously refreshed, as opposed to the prior art technique of simultaneously refreshing through separate refreshing amplifiers all the information stored along one column or one row in the array. In order to refresh the memory cells shown in FIG. 1, such as cell 20, an electrical charge is placed on all the Y-lines in the array, such as lines 13, 14, 15 and 16. Then, a positive potential is applied to all the X-lines in the array, such as lines 10 and 11. Assume for the purposes of explanation that a 1 has been previously programmed into cell 20 and that a charge exists on capacitor 32 at the time that the cell 20 is to be refreshed. The positive potential applied to lead 10 causes both devices 25 and 27 to conduct. Since a charge exists on capacitor 32, device 26 will also conduct. As device 26 conducts it causes the source terminal of device 25 to be brought substantially to ground, thereby preventing any substantial charge from accumulating on capacitor 33. On the other hand, since device 28 does not conduct and device 27 is conducting, charge placed on line 14 is transferred through device 27 onto capacitor 32, thus, refreshing the charge previously placed on that capacitor and assuring that the cell remains programmed with a 1. One problem encountered with refreshing the entire array simultaneously is that the array must dissipate a considerable amount of power during refreshing since many of the devices within the cells of the array are conducting. For this reason, the signal applied to the X-lines of the array is carefully controlled and remains positive for a predetermined period of time which in the presently preferred embodiment is less than 100n seconds.

Figure 4:
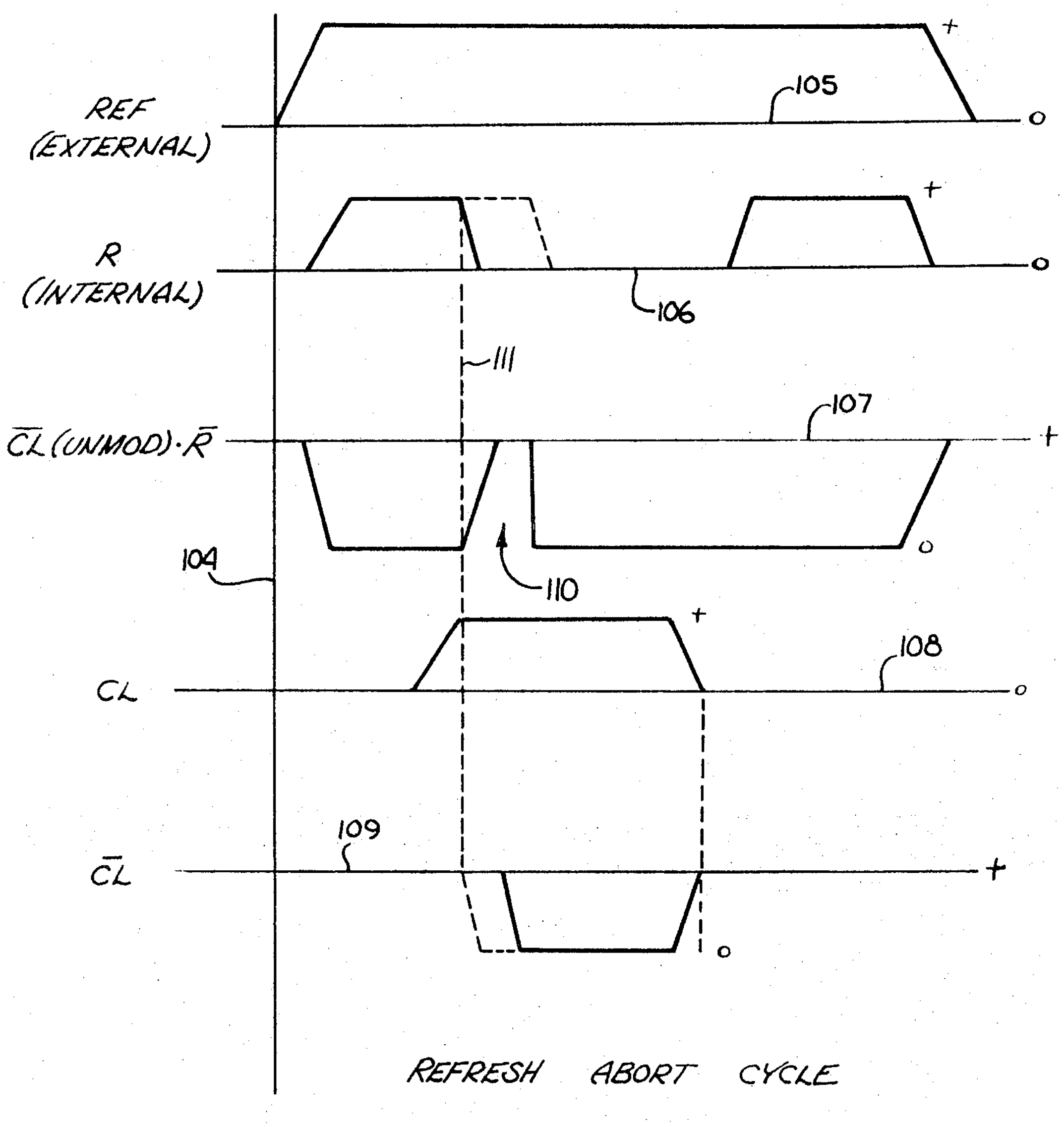
FIG. 4 is a graph illustrating several waveforms associated with the refresh abort cycle.

In the presently preferred embodiment of the invention the memory array which is fabricated on a single substrate receives external power designated $V_{DD}$ (line 41); an array enables an access signal which enables the memory to be accessed for "reading" or "writing," designated CL (line 44) and external refresh signal (line 42) and other signals such as addresses not shown in the drawings. The array generates an internal refresh signal "R" on line 43 and a $\overline{CL}$ signal on line 40 in addition to other signals. The external refresh signal, internal refresh pulse, CL, $\overline{CL}$ and an additional signal are shown in FIG. 4 for the refresh abort cycle. As will be explained in more detail, the refresh abort cycle occurs when the array is accessed during the time that the cells are being refreshed.

Figure 3:
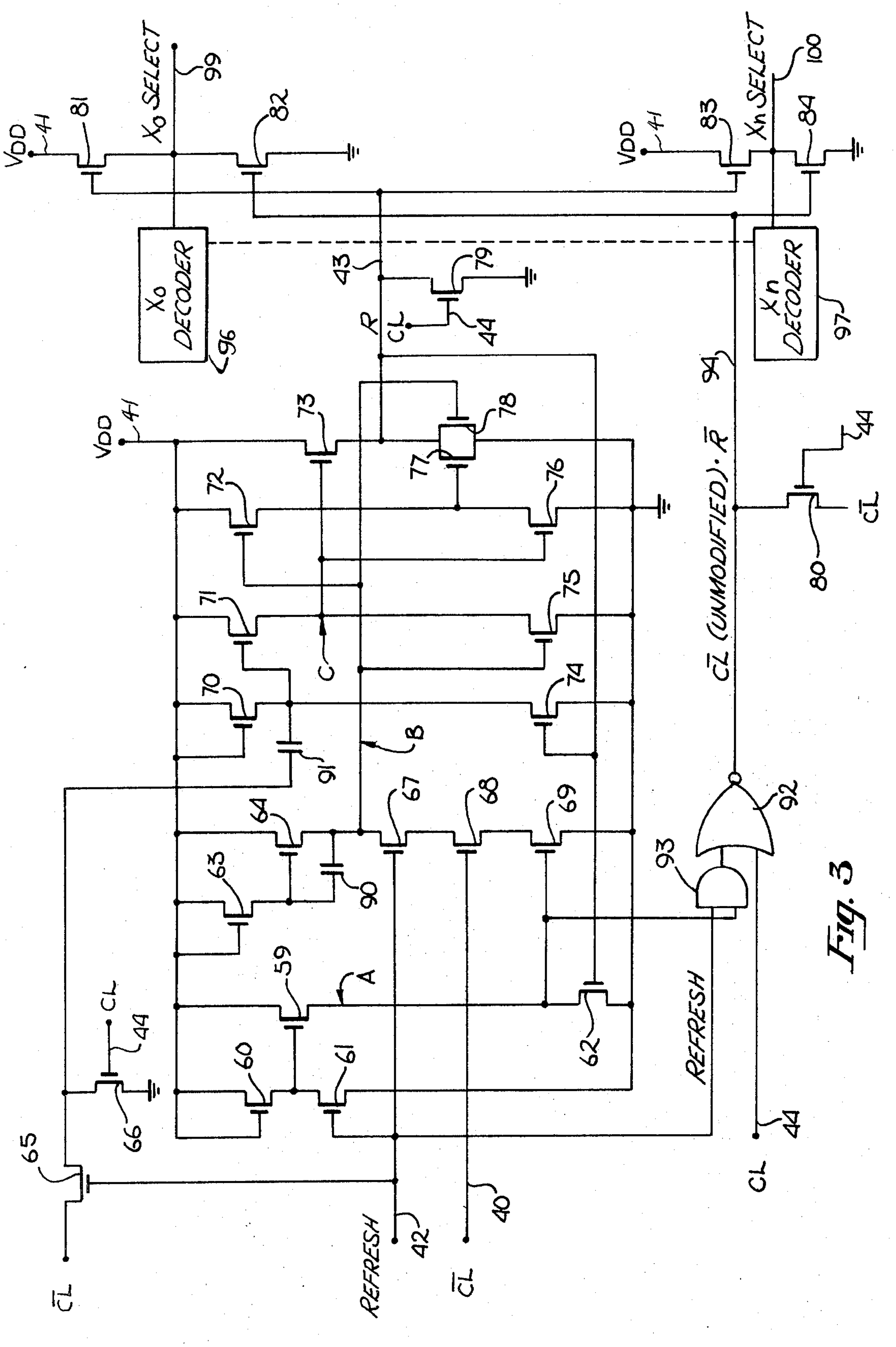
FIG. 3 is an electrical schematic illustrating the refresh buffer circuitry utilized for the refresh abort cycle and a portion of the memory array.

In FIG. 3 circuitry for providing a pulse R having a predetermined width for refreshing the memory array and other portions of the memory array are illustrated including a portion of those utilized for the refresh abort cycle. The circuit of FIG. 3 receives an external refresh signal on lead 42, this signal in the presently preferred embodiment is externally generated and applied to the memory array and has a pulse width substantially longer than that necessary for refreshing. The circuit produces a refresh pulse R on lead 43 having a predetermined duration which is used for applying a voltage $V_{DD}$ to all the X-lines in the array. The refresh pulse R has a predetermined width in the preferred embodiment of between 20 and 80 n seconds. The circuit of FIG. 3 also utilizes the $\overline{CL}$ signal which is applied to the circuit on line 40 and the CL signal which is applied to the circuit on line 44. Two decoders shown as $X_0$, decoder 96, and $X_n$, decoder 97, are illustrated in FIG. 3. It will be appreciated that a plurality of other decoders are utilized, one for each X-line in the array. These decoders are utilized for decoding an input address applied to the array and for selecting the appropriate X-line represented by a portion of that address. When one of the X-lines has been selected, the appropriate decoder produces a signal on the selected X-line, allowing information to be read into or from the cells located along that X-line. Referring to the $X_0$ line 99, MOS device 81 is coupled between the potential $V_{DD}$ (line 41) and the line 99 while MOS device 82 is coupled between the line 99 and ground. The gate of device 81 is coupled to line 43. In a similar manner MOS devices 83 and 84 are coupled to line 100 between $V_{DD}$ and ground. A pair of MOS devices are coupled in a similar manner to each of the X-lines in the array. When the refresh pulse appears on line 43 it causes devices 81 and 83 to conduct, thereby allowing a potential to be applied to lines 99 and 100 and all the other X-lines in the array. As previously discussed, this potential along with the charge placed on the Y-lines allows all the cells in the array to be simultaneously refreshed. If the refresh pulse R is of too long a duration, it can cause permanent damage to the memory from overheating or cause the information in the memory to be lost. Devices 82 and 84, as will be seen, allow any charge left on the X-lines, such as lines 99 and 100, to be discharged particularly after a refresh cycle or during the refresh abort cycle. A signal is applied to line 94 which is coupled to the gates of devices 82 and 84 when $\overline{CL}$ is positive or when the refresh pulse R is not present.

The circuit of FIG. 3 includes MOS device 60 which has one of its terminals and its gate coupled to $V_{DD}$ and its other terminal coupled to the gate of device 59 and one terminal of device 61. The other terminal of device 61 is coupled to ground. The gate of device 61 is coupled to the line 42 and, hence, receives the external refresh signal. Devices 59 and 62 are coupled in series between $V_{DD}$ and ground with the gate of device 62 being coupled to line 43. As will be seen, device 62 provides a feedback path from line 43 and is used to discharge node A thereby limiting the pulse width of "R." Devices 60 and 61 are utilized to charge node A when the external refresh pulse is not present and to prevent the continued flow of current from $V_{DD}$ to node A once the external refresh pulse is applied to line 42.

Device 63 has its gate and one terminal coupled to $V_{DD}$ and its other terminal coupled to one terminal of capacitor 90 and the gate of device 64. Device 64 is coupled between $V_{DD}$ and node B. The other terminal of capacitor 90, one terminal of device 67 and the gates of devices 72, 75 and 78 are likewise coupled to node B. Devices 67, 68 and 69 are coupled in series between node B and ground. Device 67 has its gate coupled to line 42, while the gate of device 68 receives the $\overline{CL}$ signal and the gate of device 69 is coupled to node A. Devices 63, 64 and capacitor 90 are used to bootstrap node B while devices 67, 68 and 69 are utilized to discharge this node.

Device 70 has its gate and one of its terminals coupled to $V_{DD}$ and its other terminal coupled to the gate of device 71 and one terminal of MOS device 74 and capacitor 91. The other terminal of device 74 is coupled to ground and the gate of device 74 is coupled to line 43. Device 71 is coupled between $V_{DD}$ and node C while device 75 is coupled between node C and ground. Devices 70 and 71 and capacitor 91 are utilized to charge and bootstrap node C.

Node C is coupled to the gate of device 73, and the other terminals of device 73 are coupled between $V_{DD}$ and line 43. It is the voltage which appears on node C which causes device 73 to conduct thereby causing the internal refresh pulse to appear on line 43. Devices 72 and 76 are coupled in series between $V_{DD}$ and ground with their common terminal being coupled to the gate of device 77. The gate of device 76 is coupled to node C. Devices 77 and 78 are coupled in parallel between line 43 and ground. As will be seen device 78 is utilized to discharge line 43 when node B becomes charged. Device 79 is coupled between line 43 and ground with its gate being coupled to line 44, the CL line. This device is utilized to terminate the internal refresh pulse on line 43 in the event that the CL signal (array enable signal) is received by the memory during the time that the memory is being refreshed.

Device 65 is coupled between the $\overline{CL}$ line and the other terminal of capacitor 91 with device 66 being coupled between the other terminal of capacitor 91 and ground. The gate of device 66 is coupled to the CL line 44 while the gate of device 65 receives the external refresh pulse. Device 66 is utilized to prevent the gate of device 71 from being driven above the $V_{DD}$ potential once the enable signal is applied to the array during refresh. As will be seen during the refresh abort cycle, the $\overline{CL}$ signal is delayed from returning to zero potential, thus, requiring device 66 to prevent a continued rise in potential on the gate of device 71.

An AND gate 93 receives as inputs the potential on node A and the external refresh signal; the output of the gate is supplied to NOR gate 92. NOR gate 92 receives the CL signal (line 44) as its other input. These gates may be fabricated utilizing known MOS circuits. The output from the NOR gate 92 has been designated $\overline{CL}$ (unmodified)·$\overline{R}$. These gates are used to discharge the X-lines in the array and to keep them coupled to ground except when the memory has been accessed or when the memory is being refreshed.

Device 80 is coupled between line 94 and the $\overline{CL}$ line, with its gate being coupled to the CL line. This device is used during the refresh abort cycle to first charge the line 94 (thereby discharging all the X-lines in the array) and then for discharging line 94 so as to allow the X-lines to "float." This enables one of the X-lines to be selected by one of the X-decoders during the time that the memory is accessed.

The operation of the circuit of FIG. 3 will first be explained during a normal refresh cycle, that is when the refreshing is not aborted or interrupted by a CL signal. Since CL is not present, $\overline{CL}$ will be positive and hence device 68 will be conducting and a positive potential will be applied to the drain of device 65. Prior to the time that the external refresh pulse is applied to line 42, node A is charged to the potential $V_{DD}$ less the threshold drop of device 59 through device 59. This occurs because the gate of device 59 is coupled to $V_{DD}$ through device 60. Note once the refresh pulse occurs device 61 begins conducting, causing device 59 to cease conducting, thereby isolating node A from $V_{DD}$.

Node B is also charged prior to the time that the refresh signal occurs through device 64 since the gate of device 64 is coupled to $V_{DD}$ through device 63. When the external refresh signal occurs device 67 will begin conducting and since node A is charged, device 69 will also conduct and as previously mentioned, device 68 is conducting, thus, node B is discharged through the path which includes device 67, 68 and 69. The discharge of node B causes device 75 to cease conducting and allows node C to begin charging through device 71. As node C begins charging, device 73 conducts causing line 43, the refresh pulse line, to begin rising in potential from ground 78. Note that as the potential on node B declines, device 72 will cease conducting thereby isolating the gate of device 77 from $V_{DD}$. Device 76 begins conducting as node C rises in potential thereby discharging the gate of device 77. Note also that as the potential on node B declines, device 78 ceases to conduct. Therefore, both devices 77 and 78 cease conducting isolating line 43 from ground.

Initially, the voltage on the gate of device 71 will be equal to the voltage previously applied to the gate of device 71 through device 70 plus the potential across capacitor 91 which is approximately equal to the $\overline{CL}$ signal less the threshold drop of device 65. Thus, the gate of device 71 is driven to a potential greater than $V_{DD}$, allowing node C to charge to a potential equal to $V_{DD}$. As line 43 increases in potential due to the increased conduction of device 73, additional voltage is transferred to node C through the intrinsic capacitance of device 73. If device 71 were allowed to maintain conduction during this interval, this additional charge from the capacitance of device 73 would be absorbed in the $v_{DD}$ supply through device 71. However, device 74, sensing the rise of potential on line 43, begins conducting, removing the gate potential from device 71. Node C is therefore isolated from $V_{DD}$ supply and is free to charge to a level above $V_{DD}$.

As the potential continues to rise on line 43, device 62 begins conducting, thereby discharging node A. As node A is discharged, device 69 ceases to conduct and node B begins charging through device 64. The gate of device 64 is bootstrapped by capacitor 90 to assure that node B rises to a potential equal to $V_{DD}$. As Node B rises in potential it causes device 75 to conduct thereby discharging node C and decoupling line 43 from $V_{DD}$. The rise in potential on node B also causes device 78 to conduct and discharges line 43. Thus, the width of the refresh pulse appearing on line 43 is controlled to a large extent by the rate of discharge of node A which in turn is controlled by the feedback provided by MOS device 62. By utilizing known design techniques, the refresh pulse width appearing on line 43 may be controlled to a predetermined level.

The signal on line 94 is coupled to the gates of devices 82 and 84 and the other gates and is used to "pull down" or discharge the X-lines in the array. A signal exists on the output of gate 92 anytime that the CL signal, line 44 is low or zero or when no refresh pulse exists. During refresh when the external refresh pulse is applied to line 42, the conditions of gate 93 are met since node a is also charged. During these conditions no output will be present at output NOR GATE 92. This allows the X-lines in the array to be isolated from ground since devices 82 and 84 will not conduct. Except for the refresh cycle and when the memory is accessed (CL time) the X-line in the array are grounded since a signal is present on lead 94.

Device 80 is utilized during the refresh abort cycle to discharge all the X-lines in the array, thus allowing a single X-line to then be selected by an X-line decoder such as decoder 96 or 97. As will be explained in more detail in conjunction with FIG. 2, when the CL signal appears during the refresh cycle, the $\overline{CL}$ signal does not immediately become zero but rather is delayed in returning to zero potential. The $\overline{CL}$ (unmodified) indicated in FIG. 3 on line 94 at the output of gate 92 is not delayed. The $\overline{CL}$ signal applied to one terminal of device 80 is delayed since it is derived from the circuit of FIG. 2. When the CL signal appears on lead 44 during refresh, the output of gate 92 immediately becomes zero. Note that when the enable signal, CL is received during the refresh cycle, the refresh pulse on lead 43 is immediately terminated due to the grounding of lead 43 by device 79 and also note that the bootstrapping of device 71 is terminated through device 66. Device 80 which has one of its terminals coupled to $\overline{CL}$, causes line 94 to rise in potential long enough for all the X-lines in the array to be discharged. This rise in potential is shown as reference 110 on abscissa 107 in FIG. 4. This rise in potential is necessary in order to discharge all the X-lines in the array which were charged during the refresh cycle.

Figure 2:
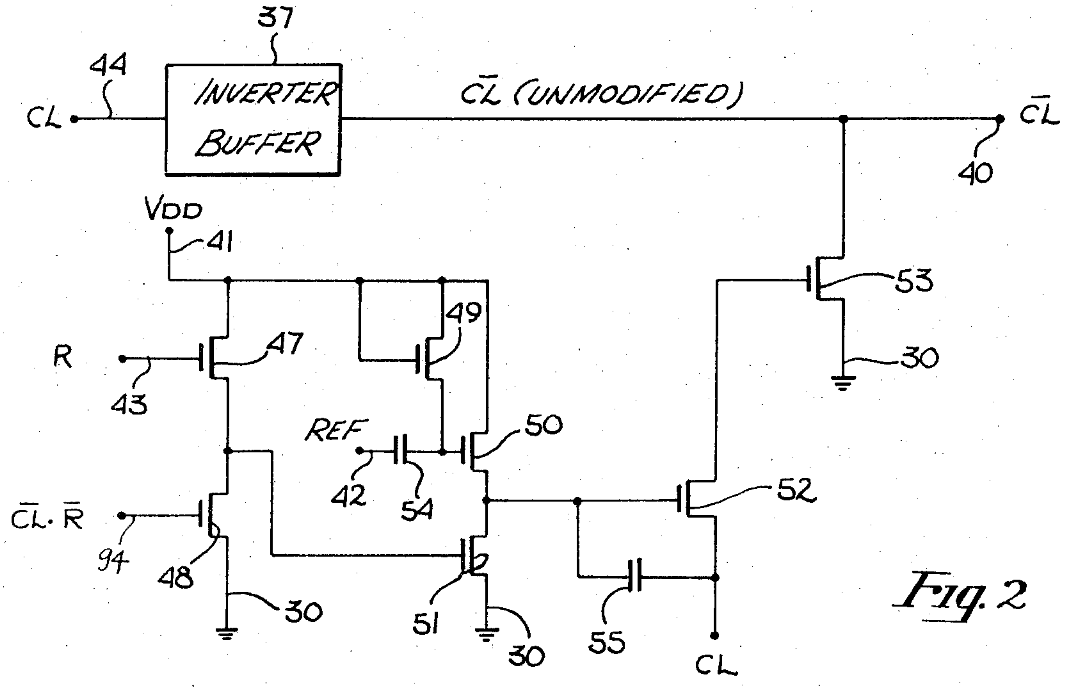
FIG. 2 is an electrical schematic illustrating primarily a portion of the circuitry utilized to implement the refresh abort cycle.

Referring to FIG. 2, the inverter buffer 37 is illustrated, this buffer is utilized for receiving the enable signal CL and for producing the complement of this signal on line 40. The presently preferred embodiment for inverter buffer 37 is illustrated in copending application Ser. No. 380,348 previously mentioned. Device 53 which is coupled between the $\overline{CL}$ line 40 and ground 30 prevents the discharge of the line 40 when the enable signal, CL, is received during refresh. The buffer illustrated in the mentioned copending application utilizes in FIG. 1 an MOS 24 for discharging line 41. That buffer may be modified by replacing device 24 of that application with device 53 of the present application.

The circuit of FIG. 2 includes MOS devices 47 and 48 which are coupled in series between the $V_{DD}$ line, line 41, and ground 30. The gate of device 47 is coupled to the refresh pulse, line 43 of FIG. 3 while the gate of MOS device 48 is coupled to line 94, the $\overline{CL} \cdot \overline{R}$ line of FIG. 3. Devices 50 and 51 are coupled in series between $V_{DD}$ and the ground 30. The gate of device 50 is coupled to $V_{DD}$ through device 49 and to the external refresh line 42 through capacitor 54. The gate of device 51 is coupled to the common junction formed between devices 47 and 48. The gate of device 53 is coupled to the CL line through device 52. The gate of device 52 is coupled to the junction formed by devices 50 and 51 and the capacitor 55 is coupled between the CL line and the gate of device 52.

First consider the circuit of FIG. 2 when no external refresh signal is present on line 42 and when the CL signal is applied to the memory. Since no refresh signal is present on line 42, no signal will be present on line 43 and device 47 will not be conducting. Also the refresh pulse signal R is not present and since the $\overline{CL}$ signal is being applied, the gate of device 51 will have been discharged through device 48, device 48 will be conducting. Device 50, on the other hand, will be conducting since its gate is coupled to $V_{DD}$ through device 49. Device 52 will likewise conduct since its gate will be coupled to $v_{Dd}$ through device 50. When the CL signal is DD to device 52 it is applied to device 53 through device 52 causing the $\overline{CL}$ line to be immediately discharged. Capacitor 55 is utilized to bootstrap the gate of device 52. Thus, if no refresh is occurring when the CL signal appears on lead 44, the $\overline{CL}$ line 40 will be immediately discharged through device 53.

Assume now that a refresh is in process and that the refresh pulse is present on line 43 at the time that CL becomes positive. Since the refresh pulse is applied to the gate of device 47, that device will conduct. Also at this time line 94 will be low, allowing the gate of device 51 to be coupled to $V_{DD}$ through device 47. This causes the gate of device 52 to be substantially coupled to ground, thereby preventing device 52 from conducting. This in turn prevents the CL signal from discharging line 40 through device 53 since device 52 is not conducting. When the CL signal is applied to the circuit of FIG. 3, it will cause the refresh pulse on line 43 to be terminated, thereby causing device 47 to cease conducting. Because of device 80 of FIG. 3, the potential on line 94 will increase causing device 48 to conduct. As device 48 conducts it causes device 51 to cease conducting, thereby allowing the gate of device 52 to rise in potential to the potential present at the source of device 50. The voltage present at the source of device 50 is substantially equal to $V_{DD}$ since the gate of device 50 is bootstrapped by the external refresh signal applied to this gate through capacitor 54. The bootstrapping of device 50 causes device 52 to heavily conduct once device 51 ceases conducting. When this occurs the CL signal is applied to the gate of device 53 discharging the $\overline{CL}$ line. The propagation delay between the gate 92 illustrated in FIG. 3 through the circuit of FIG. 2 to and including device 52, determines the delay in the decay of the $\overline{CL}$ signal.

Referring to FIGS. 1, 2 and 3, the operation of the refresh circuitry when the enable signal is not present has substantially been explained. The circuit of FIG. 3 as previously explained, upon receipt of the external refresh pulse on lead 42 will produce a refresh pulse of a predetermined width on line 43. This pulse will cause the potential $V_{DD}$, line 41, to be coupled to all the X-lines in the array allowing all of the cells in the array to be refreshed. When node A of FIG. 3 is discharged the condition of gate 93 is no longer met and a signal appears on lead 94 causing all the X-lines to be discharged and hence, ending the refreshing.

In some applications it may be desirable to have the external refresh signal operate asynchronously from the memory enable signal. First consider the case where the refresh pulse is applied to the array after the enable signal, CL, has been applied and the array is being accessed. In this event, the internal refresh pulse line 43 will be delayed until the CL signal returns to zero and the $\overline{CL}$ signal becomes positive. Referring to FIG. 3, note that the charge on node B cannot be discharged until the $\overline{CL}$ signal is positive, since this node is discharged through the series combination of devices 67, 68 and 69. While devices 67 and 68 are conducting for this situation, device 69 is not. As long as node B remains charged, line 43 will remain grounded through device 78 and, additionally, node C will remain grounded through device 75. Once the access of the array has been completed and the $\overline{CL}$ signal becomes positive, the refresh will occur. In this regard, it should be noted that the external refresh signal should be long enough in duration to accommodate the access of the array and the period of the internal refresh pulse (line 43).

Next, consider the case when the CL signal is applied when refreshing is in progress. This condition is referred to as the refresh abort cycle since the refresh is aborted. Several waveforms associated with the refresh abort cycle are illustrated. in FIG. 4. The horizontal lines in FIG. 4 represent time while the vertical line 104 represents the state of the signals indicated. Line 105 illustrates the external refresh signal which is assumed to be applied to the line 42 at the time represented by line 104. Shortly after the external refresh signal is applied, the refresh pulse "R" will appear on lead 43 of FIG. 3. This signal is illustrated on line 106 in FIG. 4. Line 107 of FIG. 4 illustrates the signal appearing on line 94 of FIG. 3 (the output of gate 94). Note that in the case of the CL (unmodified) $\overline{R}$ signal, line 107, represents the upper value of the signal, that is the positive value of this signal. This is also true for the $\overline{CL}$ signal illustrated on line 109.

Assume that at approximately the time represented by dotted line 111 (at which time the refresh is in progress) the enable signal, CL, is applied to the array as indicated on line 108. As this occurs, the refresh pulse on line 43 will immediately be terminated through device 79 of FIG. 3 as illustrated on line 106. The dotted portion of the signal shown on line 106 along with the solid portion illustrates the entire refresh pulse, the dotted portion being the portion of the refresh pulse interrupted by the application of the CL signal. Section 110 of the CL (unmodified) · $\overline{R}$ signal on line 107 illustrates the fact that line 94 is brought back to a positive potential through device 80 of FIG. 3, allowing all the X-lines in the array to be discharged. After this, again, through device 80 line 94 is returned to zero potential allowing the discharged X-lines to float. This occurs when the delayed $\overline{CL}$ signal shown on line 109 becomes zero. Note the dotted portion of the signal on line 109 represents the CL (unmodified) signal, that is, the undelayed $\overline{CL}$. Thus, once the CL signal is received, the refresh is aborted and all the X-lines are discharged. This allows the memory to be accessed.

Once the memory has been accessed and the CL signal returns to zero potential, and, provided that the external refresh signal is still present, as illustrated in FIG. 4, the array will be refreshed. Thus, it is preferable to have the external refresh signal long enough in duration to accommodate approximately two refresh pulses "R" and an access signal (CL).

Thus, a random access memory has been disclosed which allows simultaneous refresh of all the cells on the array and which permits asynchronous operation of the array enable signal and refresh signals.

I claim:

1. In a dynamic memory wherein a plurality of memory cells are simultaneously refreshed, said memory being operative to an enable signal for enabling communications of data with said memory and a refresh signal for controlling the refreshing of said plurality of memory cells, a system for refreshing said plurality of cells wherein said refresh signal and said enable signal are asynchronous comprising:

logic circuit means for generating a refresh abort signal in the event said enable signal is applied to said memory while said plurality of cells are being refreshed; and a refresh pulse generator for generating a refresh pulse of a predetermined width for refreshing said plurality of memory cells upon receipt of said refresh signal, said generator including a. means for aborting generation of said refresh pulse upon generation of said refresh abort signal, b. means for generating said refresh pulse after the termination of said refresh abort signal provided said refresh signal is present and said generator has generated a refresh pulse of less than said predetermined width prior to the last generation of said refresh abort signal, and, c. means for preventing generation of said refresh pulse in the event said refresh signal is received by said generator during said communications of data with said memory, whereby said enable signal and refresh signal may be independent.

2. The dynamic memory of claim 1 wherein the duration of said refresh pulse is less than one-half the difference in duration of said enable signal and said refresh signal.

* * * * *